US010534943B2

(12) United States Patent
Ikeda

(10) Patent No.: US 10,534,943 B2
(45) Date of Patent: Jan. 14, 2020

(54) INFORMATION READING DEVICE

(71) Applicant: NIDEC SANKYO CORPORATION, Suwa-gun, Nagano (JP)

(72) Inventor: Masahiro Ikeda, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/168,008

(22) Filed: Oct. 23, 2018

(65) Prior Publication Data
US 2019/0130147 A1 May 2, 2019

(30) Foreign Application Priority Data
Oct. 26, 2017 (JP) .................................. 2017-206987

(51) Int. Cl.
G06K 7/10 (2006.01)
(52) U.S. Cl.
CPC .............................. G06K 7/10722 (2013.01)
(58) Field of Classification Search
CPC combination set(s) only.
See application file for complete search history.

(56) References Cited

U.S. PATENT DOCUMENTS

| 2005/0139669 | A1* | 6/2005 | Arnouse | G06K 7/00 235/440 |
| 2009/0026271 | A1* | 1/2009 | Drzymala | G06K 7/10722 235/462.42 |
| 2009/0073503 | A1* | 3/2009 | Lebaschi | H04N 1/00326 358/450 |
| 2012/0293642 | A1* | 11/2012 | Berini | G06F 21/32 348/77 |

FOREIGN PATENT DOCUMENTS

WO 2014129152 A1 8/2014

* cited by examiner

Primary Examiner — Daniel A Hess
(74) Attorney, Agent, or Firm — Cantor Colburn LLP

(57) ABSTRACT

An information reading device may include a transparent placement member, a first illumination part, a second illumination part, a first optical system structured to read information on the medium, a second optical system structured to read another information on the medium, a housing formed with a medium insertion port and in which the placement member, the first illumination part, the second illumination part, the first optical system and the second optical system are accommodated, and a semi-light shielding member having a semi-light shielding part which transmits light of a part of a wavelength region and blocks lights of other wavelength regions and covers at least an upper side of the medium insertion port. A transmittance curve indicating a relationship between transmittance of light and a wavelength of the semi-light shielding part is a curve having a peak within a wavelength region of visible light.

15 Claims, 9 Drawing Sheets

INFORMATION READING DEVICE

CROSS REFERENCE TO RELATED APPLICATION

The present application claims priority under 35 U.S.C. § 119 to Japanese Application No. 2017-206987 filed Oct. 26, 2017, the entire content of which is incorporated herein by reference.

TECHNICAL FIELD

At least an embodiment of the present invention may relate to an information reading device structured to optically read information recorded on an information recording medium.

BACKGROUND

Conventionally, an image reading device structured to read an image of a reading object has been known (see, for example, International Publication No. WO 2014/129152). The image reading device described in the above-mentioned patent literature includes a cover glass on which a reading object is placed. A light source element and a light guide body for irradiating a reading object with light emitted from the light source element are disposed on a lower side of the cover glass. Further, an imaging-forming optical system and a sensor IC are disposed under the cover glass. The image reading device reads an image of an under face of the reading object which is placed on the cover glass.

The present inventor has examined a structure of an information reading device which is capable of optically reading information on one face of an information recording medium and then optically reading information on the other face of the information recording medium even through the information recording medium is not taken out and then insert again. In other words, the present inventor has examined a structure of an information reading device which is capable of optically reading information on both sides of an information recording medium without performing taking-in and taking-out of the information recording medium. In the image reading device described in the above-mentioned patent literature, in order to optically read information recorded on both sides of an information recording medium without performing taking-in and taking-out of the information recording medium, it is sufficient to additionally provide illumination for irradiating an upper face of the information recording medium placed on the cover glass with light and an optical system and the like for reading information of the upper face of the information recording medium.

In a case that information of an under face of an information recording medium is to be optically read, for example, when a width in an upper and lower direction of an insertion port of an information reading device for the information recording medium is set as narrow as possible, influence of external light (disturbance light) on an image of the under face of the information recording medium read by the information reading device can be restrained. However, the present inventor has found through examinations that, in a case that information of an upper face of an information recording medium is to be optically read, even when the width in the upper and lower direction of the insertion port is narrowed, an image of the upper face of the information recording medium read by the information reading device is easily affected by external light.

When a width in the upper and lower direction of an insertion port is narrowed, an information recording medium is hard to be inserted into the information reading device. Further, in a case that a width in the upper and lower direction of the insertion port is narrowed, an image of the upper face of the information recording medium is easily affected by external light. Therefore, the present inventor has examined that a width in the upper and lower direction of an insertion port is widened in consideration of operability when the information recording medium is to be inserted into the information reading device, and that a light shielding member is provided on a front face side of the information reading device for restraining influence of external light on an image of the information recording medium read by the information reading device.

The present inventor has found that, when a light shielding member is provided on a front face side of the information reading device, influence of external light on an image of an upper face of the information recording medium read by the information reading device can be restrained. Further, the present inventor has found that, when a width in the upper and lower direction of an insertion port is widened, an image of an under face of an information recording medium is easily affected by external light. However, the present inventor has found that, when a light shielding member is provided on a front face side of the information reading device, influence of the external light on an image of the under face of the information recording medium can be also restrained.

However, the present inventor has found through examinations that, in a case that a light shielding member is provided on a front face side of the information reading device, an inside of the information reading device becomes hard to be seen by the light shielding member and thus, when an information recording medium is inserted into the information reading device, the information recording medium in an inside of the information reading device is hard to be confirmed by visual observation, and it is difficult to confirm by visual observation whether the information recording medium is placed at a predetermined position of a cover glass or not. In order to solve the problem, it may be conceivable that, when an information recording medium is to be inserted into the information reading device, the light shielding member is turned or the like to retreat to a position where the information recording medium in the inside of the information reading device can be confirmed by visual observation. However, each time an information recording medium is inserted, when the light shielding member is retreated to a position where the information recording medium in the inside of the information reading device can be confirmed by visual observation, operability of the information reading device is deteriorated.

SUMMARY

In view of the problem described above, at least an embodiment of the present invention may advantageously provide an information reading device which is capable of optically reading information recorded on both faces of an information recording medium, in which influence of external light on an image of the information recording medium read by the information reading device can be restrained and operability is enhanced even when the information recording medium inserted into the information reading device can be confirmed by visual observation.

According to at least an embodiment of the present invention, there may be provided an information reading device structured to optically read information recorded on an information recording medium. The information reading device includes a transparent placement member on which the information recording medium is placed, a first illumination part which emits light on an under face of the information recording medium placed on the placement member, a second illumination part which emits light on an upper face of the information recording medium placed on the placement member, a first optical system structured to read information recorded on the under face of the information recording medium placed on the placement member, a second optical system structured to read information recorded on the upper face of the information recording medium placed on the placement member, a housing whose front face is formed with a medium insertion port into which the information recording medium is inserted and in which the placement member, the first illumination part, the second illumination part, the first optical system and the second optical system are accommodated, and a semi-light shielding member provided with a semi-light shielding part which transmits light of a part of a wavelength region and blocks lights of other wavelength regions and covers at least an upper side of the medium insertion port. A transmittance curve indicating a relationship between transmittance of light and a wavelength of the semi-light shielding part is a curve having a peak within a wavelength region of visible light.

The information reading device in at least an embodiment of the present invention includes a semi-light shielding member provided with a semi-light shielding part which transmits light of a part of a wavelength region and blocks lights of other wavelength regions and covers at least an upper side of the medium insertion port. Therefore, according to at least an embodiment of the present invention, influence of external light on an image of the information recording medium read by the information reading device can be restrained by the semi-light shielding part. Further, in at least an embodiment of the present invention, a transmittance curve indicating a relationship between transmittance of light and a wavelength of the semi-light shielding part is a curve having a peak within a wavelength region of visible light. Therefore, according to at least an embodiment of the present invention, in a case that an information recording medium is to be inserted into the information reading device, even when the semi-light shielding member is not moved to a position where the information recording medium in an inside of the information reading device can be directly confirmed by visual observation (in other words, even when a part of the medium insertion port is covered by the semi-light shielding part), the information recording medium inserted into the information reading device can be confirmed by visual observation through the semi-light shielding part. Accordingly, in at least an embodiment of the present invention, even when the information recording medium inserted into the information reading device can be confirmed by visual observation, operability of the information reading device is enhanced.

In at least an embodiment of the present invention, the semi-light shielding member is movable with respect to the housing between a light shielding position where the semi-light shielding part covers an upper side and a front side of the medium insertion port and an open position where at least the front side of the medium insertion port is opened. According to this structure, the semi-light shielding part covers an upper side and a front side of the medium insertion port when the semi-light shielding member is disposed at the light shielding position and thus, even when the information reading device is provided in a place which is easily affected by external light, influence of the external light on an image of the information recording medium read by the information reading device can be restrained.

In at least an embodiment of the present invention, the semi-light shielding part is formed with a cut-out part structured to prevent an interference of a hand of an operator pressing down the information recording medium placed on the placement member from an upper side with the semi-light shielding part when the semi-light shielding member is located at the light shielding position. According to this structure, even when the semi-light shielding member is disposed at the light shielding position, an operator is capable of pressing down the information recording medium placed on the placement member toward the placement member. Therefore, for example, in a case that information of an under face of an information recording medium which is easily floated from an upper face of the placement member like a new passport or a passport having a number of pages is to be read, even when the semi-light shielding member is disposed at the light shielding position, floating of an under face of the information recording medium from the upper face of the placement member is prevented and information of the under face of the information recording medium can be read with a high degree of accuracy.

In at least an embodiment of the present invention, the transmittance curve has only one peak within a wavelength region of visible light. According to this structure, in comparison with a case that the transmittance curve has a plurality of peaks within a wavelength region of visible light, a width of a wavelength region of light transmitting through the semi-light shielding part can be narrowed. Therefore, influence of external light on an image of the information recording medium read by the information reading device can be effectively restrained.

In at least an embodiment of the present invention, the transmittance curve has a peak within a wavelength region from 500 nm to 560 nm. In other words, the transmittance curve has a peak within a wavelength region of green light. Relative luminous efficiency of a human eye becomes the maximum for the light of a wavelength region of green light. Therefore, according to this structure, even when transmittance of light transmitting through the semi-light shielding part is reduced, the information recording medium inserted into the information reading device is easily confirmed by visual observation through the semi-light shielding part. Accordingly, influence of external light on an image of an information recording medium read by the information reading device can be effectively restrained by reducing transmittance of light transmitting through the semi-light shielding part and, in addition, the information recording medium inserted into the information reading device is easily confirmed by visual observation through the semi-light shielding part.

In at least an embodiment of the present invention, a half-value width of the peak of the transmittance curve is 80 nm or less. According to this structure, a width of a wavelength region of light transmitting through the semi-light shielding part can be narrowed. Therefore, influence of external light on an image of an information recording medium read by the information reading device can be effectively restrained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

At least an embodiment of the present invention will be described below with reference to the accompanying drawings.

(Entire Structure of Information Reading Device)

Figure 1:
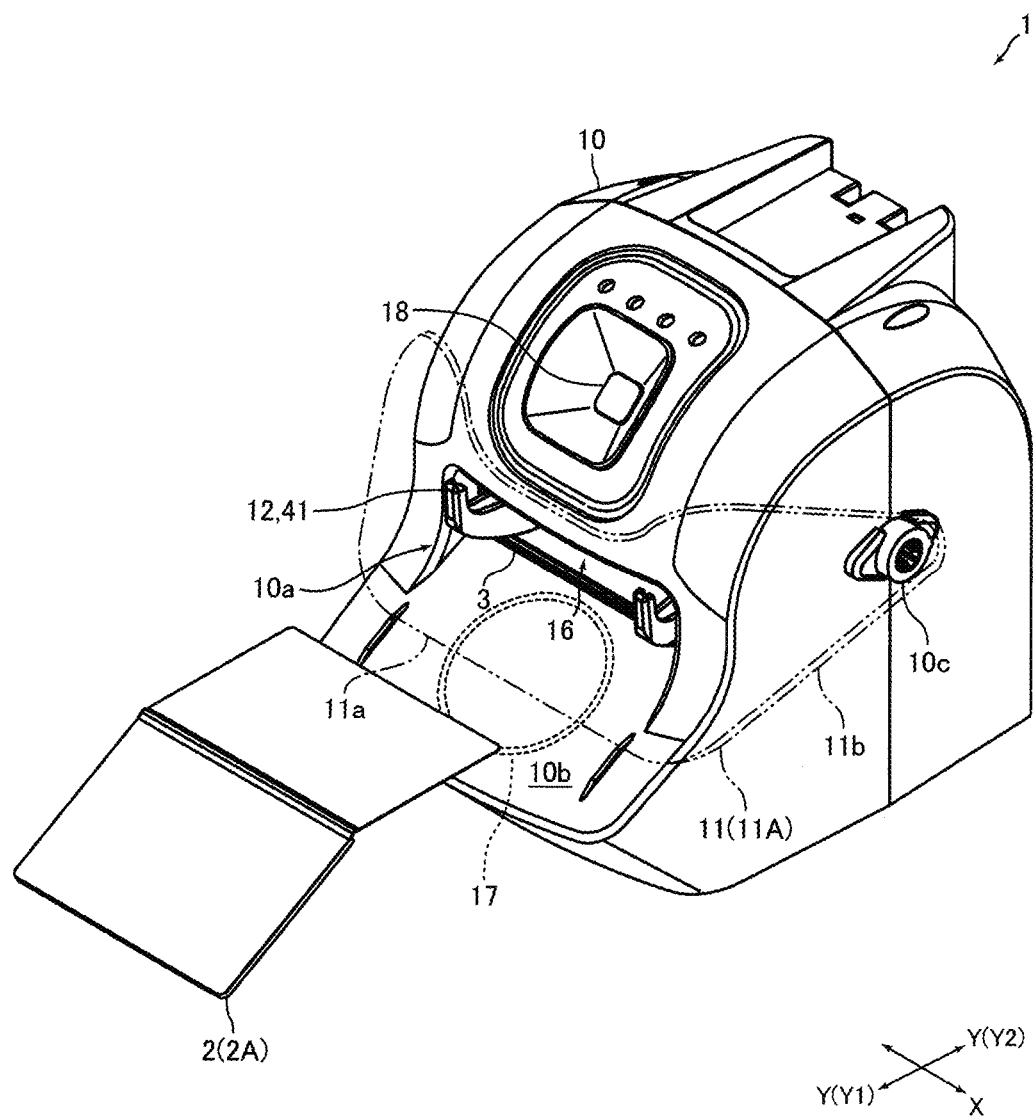
FIG. 1 is a perspective view showing an information reading device in accordance with an embodiment of the present invention.
Figure 2:
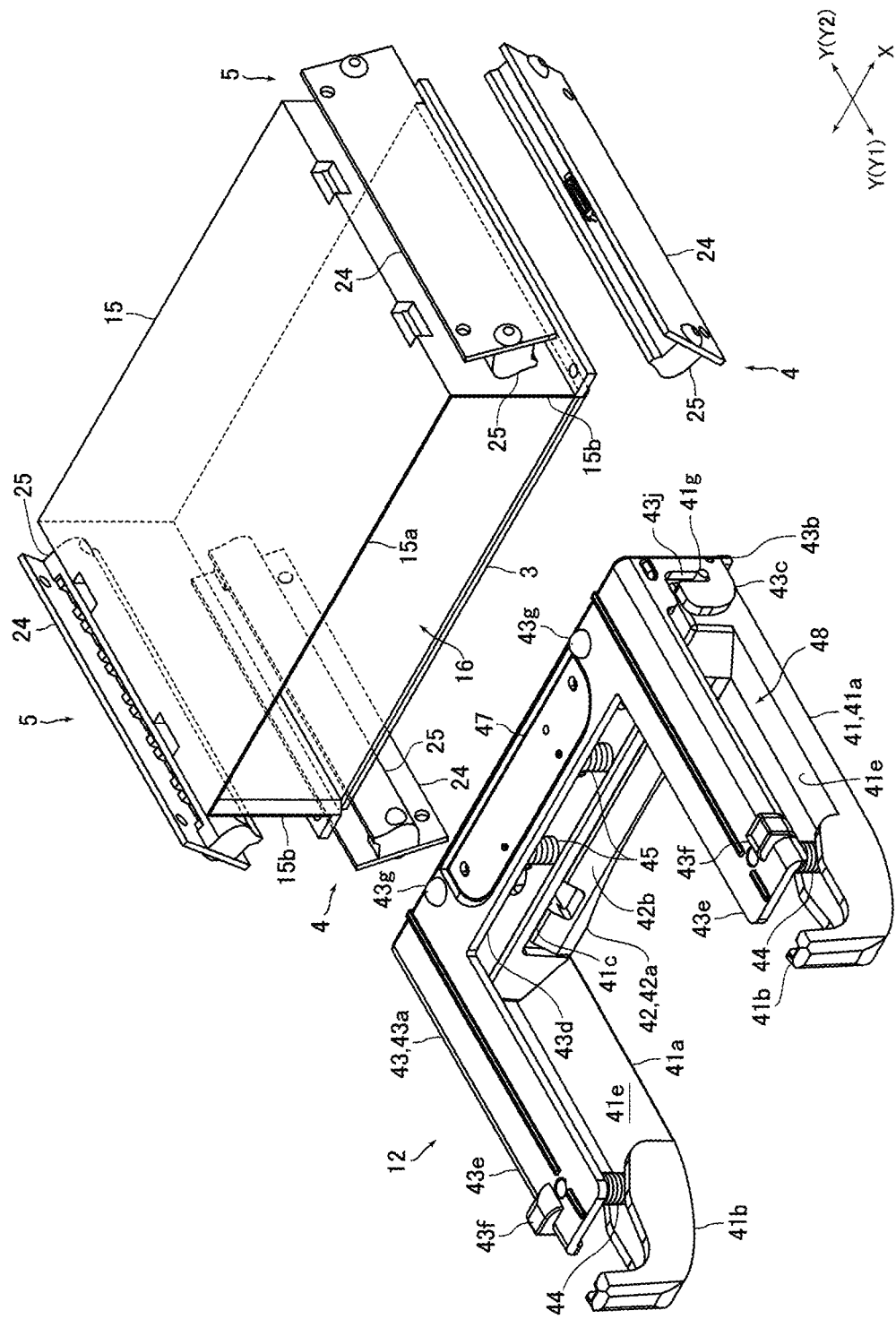
FIG. 2 is a perspective view showing a placement member, a cover member, a first illumination part, a second illumination part and a medium pressing mechanism of the information reading device shown in FIG. 1.
Figure 3A:
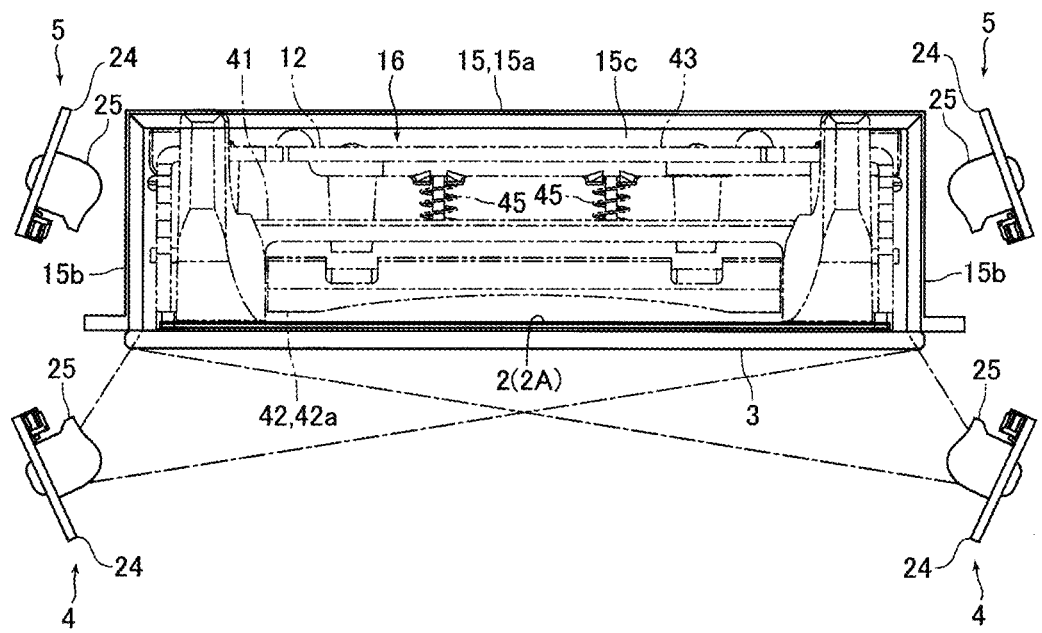
FIG. 3A and FIG. 3B are front views showing the placement member, the cover member, the first illumination part, the second illumination part and the medium pressing mechanism shown in FIG. 2.
Figure 3B:
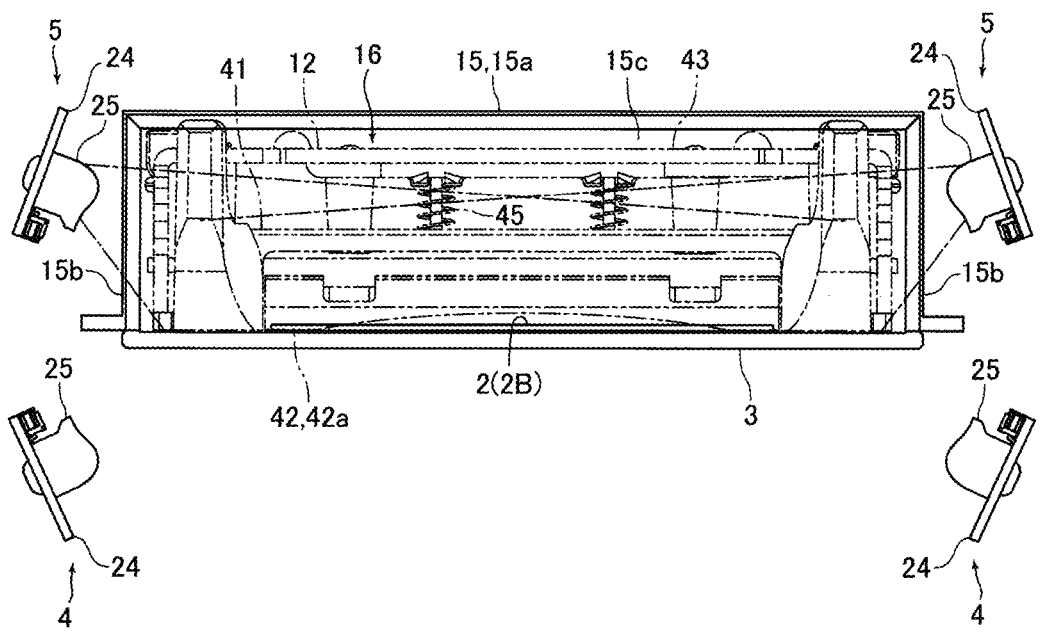
Figure 4:
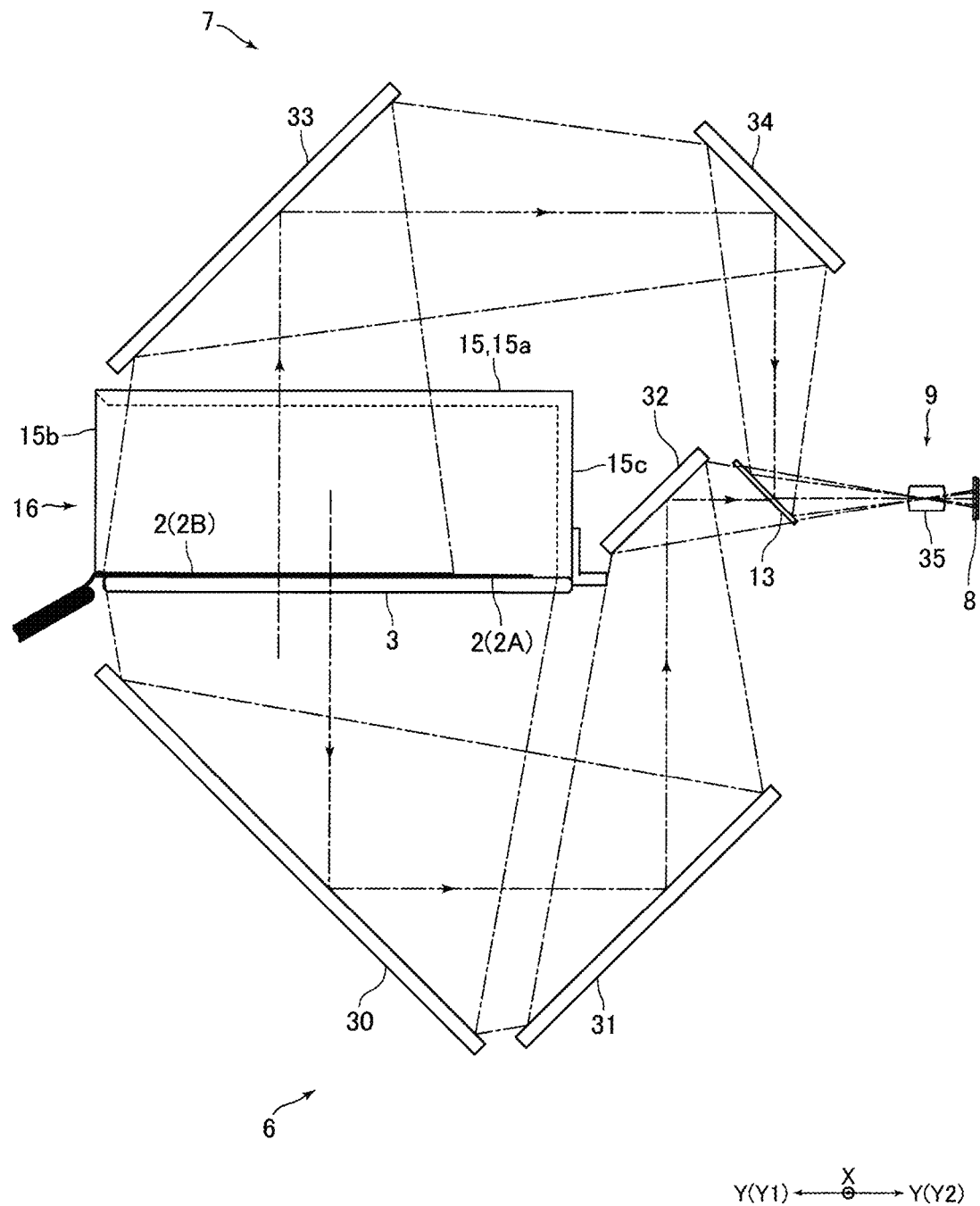
FIG. 4 is an explanatory side view showing optical paths in an inside of the information reading device shown in FIG. 1.
Figure 5A:
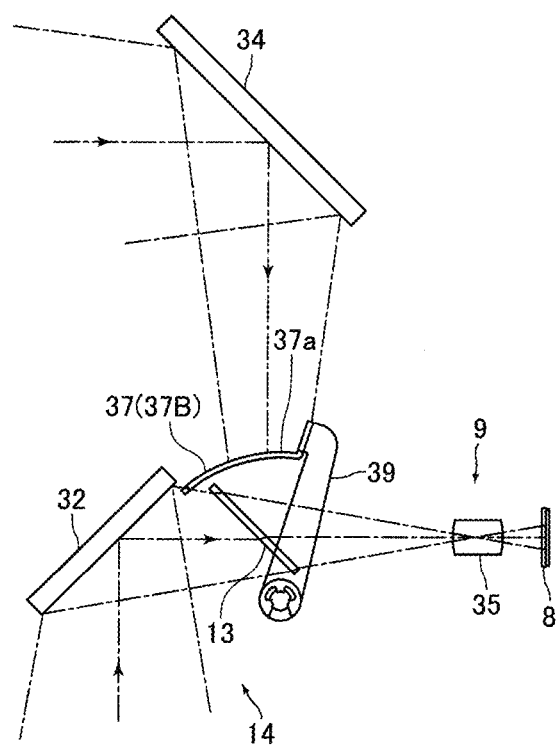
FIG. 5A and FIG. 5B are explanatory side views showing an operation of a shutter mechanism of the information reading device shown in FIG. 1.
Figure 5B:
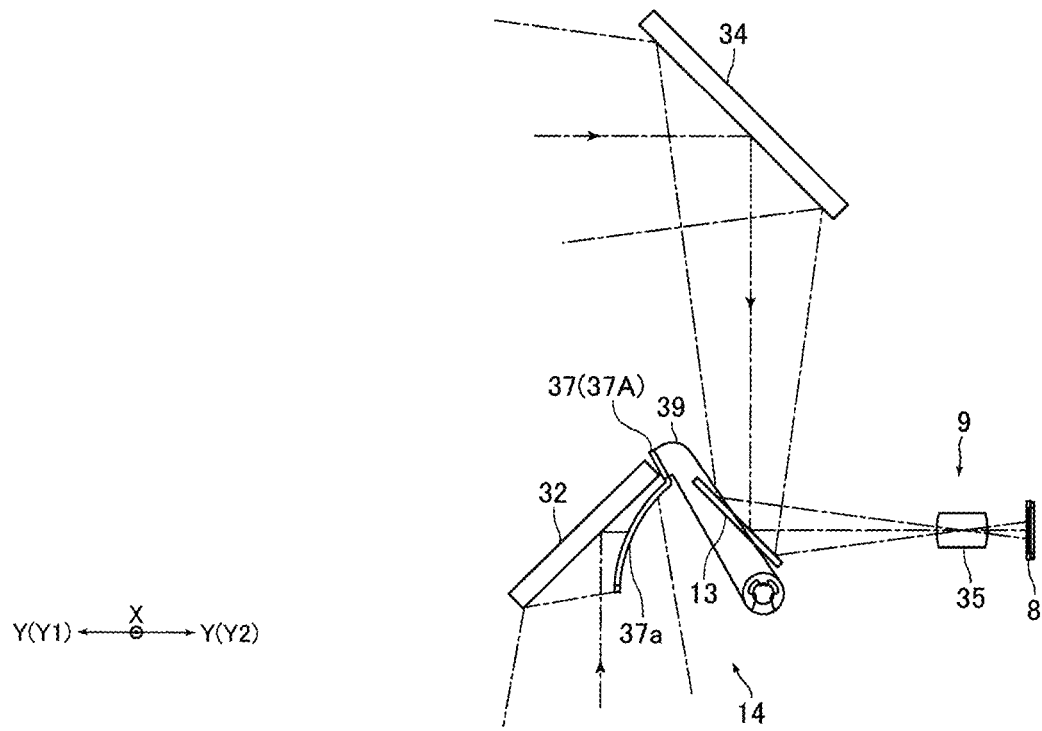

FIG. 1 is a perspective view showing an information reading device 1 in accordance with an embodiment of the present invention. FIG. 2 is a perspective view showing a glass plate 3, a cover member 15, illumination parts 4 and 5, and a medium pressing mechanism 12 of the information reading device 1 shown in FIG. 1. FIG. 3A and FIG. 3B are front views showing the glass plate 3, the cover member 15, illumination parts 4 and 5, and the medium pressing mechanism 12 shown in FIG. 2. FIG. 4 is an explanatory side view showing optical paths in an inside of the information reading device 1 shown in FIG. 1. FIG. 5A and FIG. 5B are explanatory side views showing an operation of a shutter mechanism 14 of the information reading device 1 shown in FIG. 1.

An information reading device 1 in at least an embodiment of the present invention is a device structured to optically read information recorded on an information recording medium 2. In other words, the information reading device 1 is a device structured to read characters, a graphic and the like which are printed or the like on an information recording medium 2. The information reading device 1 is a manual type reading device, and an insertion of an information recording medium 2 to the information reading device 1 and taking-out of the information recording medium 2 from the information reading device 1 are manually performed. Further, the information reading device 1 in this embodiment is a comparatively small table top type reading device. An information recording medium 2 which is read by the information reading device 1 is a passport 2A and an ID card 2B (see FIG. 3A and FIG. 3B).

In a case that an information recording medium 2 is a passport 2A, information recorded on a rear face of a front cover of the passport 2A is optically read by the information reading device 1. In a case that an information recording medium 2 is an ID card 2B, information recorded on each of both faces of the ID card 2B is optically read by the information reading device 1. A passport 2A in this embodiment is an IC passport including an IC page in which an IC chip and an antenna for communication are incorporated. Further, an ID card 2B is a non-contact type IC card, and an IC chip and an antenna for communication is incorporated. in the ID card 2B. The ID card 2B is formed in a rectangular shape. Further, The ID card 2B is, for example, a rectangular card made of vinyl chloride whose thickness is about 0.7-0.8 mm.

The passport 2A is inserted into the information reading device 1 in an opened state. A thickness direction of a front cover in an opened state of the passport 2A which is inserted into the information reading device 1 is coincided with an upper and lower direction. Further, a thickness direction of an ID card 2B inserted into the information reading device 1 is coincided with the upper and lower direction. In FIG. 4, for convenience of explanation, both of the passport 2A and the ID card 2B are inserted into the information reading device 1. However, actually, one of the passport 2A and the ID card 2B is inserted into the information reading device 1.

In the following descriptions, an inserting direction side of an information recording medium 2 to the information reading device 1 ("Y2" direction side in FIG. 1 and the like) is referred to as a "back" side or a "rear" side, and a taking-out direction side of the information recording medium 2 from the information reading device 1 is referred to as a "front" side ("Y1" direction side in FIG. 1 and the like). Further, an insertion and taking-out direction of an information recording medium 2 with respect to the information reading device 1 is referred to as a "front and rear direction" ("Y" direction in FIG. 1 and the like), and a direction perpendicular to the upper and lower direction and the front and rear direction is referred to as a "right and left direction" ("X" direction in FIG. 1 and the like).

The information reading device 1 includes a transparent glass plate 3 on which an information recording medium 2 is placed, an illumination part 4 structured to irradiate an under face of the information recording medium 2 placed on the glass plate 3 with light, an illumination part 5 structured to irradiate an upper face of the information recording medium 2 placed on the glass plate 3 with light, an optical system 6 structured to read information recorded on the under face of the information recording medium 2 placed on the glass plate 3, an optical system 7 structured to read information recorded on the upper face of the information recording medium 2 placed on the glass plate 3, an image pickup element 8, and an image-forming optical system 9 which forms an image of the light passed through the optical system 6 on the image pickup element 8 and forms an image of the light passed through the optical system 7 on the image pickup element 8.

The glass plate 3, the illumination parts 4 and 5, the optical systems 6 and 7, the image pickup element 8 and the image-forming optical system 9 are accommodated in a housing 10. The image pickup element 8 is a two-dimensional CMOS image sensor or CCD image sensor. The glass plate 3 in this embodiment is a placement member, and the illumination part 4 is a first illumination part and the illumination part 5 is a second illumination part. Further, the optical system 6 is a first optical system and the optical system 7 is a second optical system.

The information reading device 1 includes a semi-light shielding member 11 attached to the housing 10 and a medium pressing mechanism 12 structured to press down both end parts in the right and left direction of the passport 2A placed on the glass plate 3 from an upper side. In addition, the information reading device 1 includes a beam splitter 13, which transmits a part of the light passed through the optical system 6 toward the image-forming optical system 9 and reflects a part of the light passed through the optical system 7 toward the image-forming optical system 9, and a shutter mechanism 14 structured to block the light made incident to the beam splitter 13 from the optical system 7 when information recorded on the under face of the information recording medium 2 placed on the glass plate 3 is to be read, and to block the light made incident to the beam splitter 13 from the optical system 6 when information recorded on the upper face of the information recording medium 2 placed on the glass plate 3 is to be read. The beam splitter 13 and the shutter mechanism 14 are accommodated in the housing 10. In FIG. 4, the medium pressing mechanism 12 is not shown.

The information reading device 1 includes a cover member 15 which is provided with an upper face part 15a disposed on an upper side with respect to an information recording medium 2 placed on the glass plate 3, two side face parts 15b connected with both end sides in the right and left direction of the upper face part 15a, and a rear face part 15c connected with a rear end side of the upper face part 15a. The cover member 15 in this embodiment is structured of the upper face part 15a, two side face parts 15b and the rear face part 15c. The cover member 15 is formed of transparent resin such as acrylic resin. The rear face part 15c is coated with, for example, a light shielding coating material and the rear face part 15c is formed to be a light shielding part which blocks the light directing to the rear side. On the other hand, the upper face part 15a and the side face parts 15b are transparent.

The upper face part 15a is formed in a rectangular flat plate shape and is disposed so that a thickness direction of the upper face part 15a and the upper and lower direction are coincided with each other. Further, the upper face part 15a is disposed so that end faces of the upper face part 15a are parallel to the front and rear direction or the right and left direction. The side face part 15b is formed in a rectangular flat plate shape and is disposed so that a thickness direction of the side face part 15b and the right and left direction are coincided with each other. The rear face part 15c is formed in a rectangular flat plate shape and is disposed so that a thickness direction of the rear face part 15c and the front and rear direction are coincided with each other. Both right and left ends of the rear face part 15c are connected with the rear ends of the side face parts 15b.

The glass plate 3 is formed in a rectangular flat plate shape and is disposed so that a thickness direction of the glass plate 3 and the upper and lower direction are coincided with each other. Further, the glass plate 3 is disposed so that end faces of the glass plate 3 are parallel to the front and rear direction or the right and left direction. Lower ends of the side face parts 15b and a lower end of the rear face part 15c are contacted with an upper face of the glass plate 3. In this embodiment, a box-shaped medium arrangement part 16 is formed by the glass plate 3 and the cover member 15 so that its front face is opened and in which at least a part of an information recording medium 2 is disposed. The medium arrangement part 16 is formed in a rectangular parallelepiped box shape and is accommodated in the housing 10. A width in the upper and lower direction of an opening of the front face of the medium arrangement part 16 (in other words, a distance between an upper face of the glass plate 3 and an under face of the upper face part 15a) is set to be extremely wider than a thickness of the information recording medium 2.

As shown in FIG. 1, a portion of the medium arrangement part 16 except the opening of the front face is covered by the housing 10. A front face of the housing 10 is formed with a medium insertion port 10a through which an information recording medium 2 to be placed on the glass plate 3 is inserted. The medium insertion port 10a is disposed in front of the opening of the front face of the medium arrangement part 16. A width in the upper and lower direction of the medium insertion port 10a is set to be wider than a width in the upper and lower direction of the opening of the front face of the medium arrangement part 16. A width in the right and left direction of the medium insertion port 10a is set to be slightly wider than a width in the right and left direction of the opening of the front face of the medium arrangement part 16.

An entire ID card 2B is placed on the glass plate 3. In other words, the entire ID card 2B is disposed in the medium arrangement part 16. Further, a part of a passport 2A is placed on the glass plate 3 so that a back cover of the passport 2A in an opened state is disposed on a front end side of the glass plate 3. In other words, a part of the passport 2A is disposed in the medium arrangement part 16. The passport 2A is placed on the glass plate 3 so that a rear face of a front cover where personal information is recorded faces a lower side. In this embodiment, a width in the front and rear direction of a portion of the passport 2A which is placed on the glass plate 3 is wider than a width in the front and rear direction of the ID card 2B placed on the glass plate 3. Further, a width in the right and left direction of the passport 2A is wider than a width in the right and left direction of the ID card 2B placed on the glass plate 3.

A passport 2A in this embodiment is a passport prepared along the guideline released by the International Civil Aviation Organization (ICAO). A rear face of the front cover of the passport 2A placed on the glass plate 3 is provided with a face photograph, a full name and the like. Further, characters used for character recognition are recorded in rear end portions of both end parts in the right and left direction of the rear face of the front cover of the passport 2A.

An antenna (not shown) for communicating with a communication antenna incorporated in an ID card 2B is disposed on a lower side of the glass plate 3. The antenna is disposed at a position without a hindrance when information of an under face of the information recording medium 2 placed on the glass plate 3 is to be optically read. Further, as shown in FIG. 1, an antenna 17 for communicating with a communication antenna incorporated in the passport 2A is disposed on a front side with respect to the glass plate 3. The antenna 17 is disposed on a lower side with respect to the glass plate 3. In accordance with an embodiment of the present invention, communication may be performed between the antenna disposed on the lower side of the glass plate 3 and the antenna incorporated in the passport 2A depending on the specifications of the passport 2A.

The information reading device 1 includes, as shown in FIG. 1, a camera 18 disposed on the front face side and the upper face side of the information reading device 1. The camera 18 is disposed on the upper side with respect to the medium arrangement part 16. An optical axis of the camera 18 is inclined toward the upper side as going to the front side. The camera 18 photographs, for example, a face of a person performing a reading operation of an information recording medium 2.

(Structure and Arrangement of Illumination Part)

Each of the illumination parts 4 and 5 includes a circuit board 24 on which a plurality of light sources is mounted and an illumination lens 25 to which lights emitted from the light sources are made incident. Each of the illumination parts 4 and 5 in this embodiment includes as the light sources, a plurality of white LEDs which emit white light, a plurality of infrared LEDs which emit infrared light, and a plurality of ultraviolet LEDs which emit ultraviolet light. The circuit board 24 is formed in a long and slender rectangular flat plate shape. The illumination lens 25 is formed in a long and slender roughly rectangular solid shape. The illumination lens 25 is fixed to a face of the circuit board 24 on which the light sources are mounted.

The white light emitted from the white LED, the infrared light emitted from the infrared LED and the ultraviolet light emitted from the ultraviolet LED are made incident to the illumination lens 25. The light transmitted through the illumination lens 25 is irradiated on the information recording medium 2. In this embodiment, the infrared lights emitted from the illumination parts 4 and 5 are used for reading mechanical reading type printed information such as OCR characters. Further, the ultraviolet lights emitted from the illumination parts 4 and 5 are used for reading printed information required to determine authenticity of the information recording medium 2. Specifically, the ultraviolet lights emitted from the illumination parts 4 and 5 are used for reading information printed by invisible fluorescent color developing ink.

As shown in FIG. 3A and FIG. 3B, the illumination parts 4 are disposed on a lower side with respect to the glass plate 3. Further, the information reading device 1 includes two illumination parts 4, and the illumination parts 4 are respectively disposed on outer sides in the right and left direction of the glass plate 3. An information recording medium 2 placed on the glass plate 3 is irradiated with lights of the illumination parts 4 from outer sides in the right and left direction and from obliquely lower sides. Further, as shown in FIG. 3A, an under face of the information recording medium 2 placed on the glass plate 3 is irradiated with the lights which are emitted from the illumination parts 4 and transmitted through the glass plate 3.

The illumination parts 5 are disposed on an upper side with respect to the information recording medium 2 placed on the glass plate 3. Further, the information reading device 1 includes two illumination parts 5, and the illumination parts 5 are respectively disposed on outer sides in the right and left direction of the medium arrangement part 16. In other words, one of the two illumination parts 5 is disposed on the right side of the side face part 15b disposed on the right side, and the other of the two illumination parts 5 is disposed on the left side of the side face part 15b disposed on the left side. The information recording medium 2 placed on the glass plate 3 is irradiated with lights of the illumination parts 5 from outer sides in the right and left direction and from obliquely upper sides. Further, as shown in FIG. 3B, an upper face of the information recording medium 2 placed on the glass plate 3 is irradiated with the lights which are emitted from the illumination parts 5 and transmitted through the side face parts 15b.

(Structure and Arrangement of Optical System, Image-Forming Optical System, Beam Splitter and Image Pickup Element)

The optical system 6 includes three reflection mirrors (total reflection mirror) 30, 31 and 32 which are formed in a rectangular flat plate shape. The reflection mirrors 30 and 31 are disposed on a lower side with respect to the glass plate 3. Specifically, the reflection mirror 30 is disposed on a lower side of a passport 2A placed on the glass plate 3. Further, the reflection mirror 31 is disposed at the substantially same height as the reflection mirror 30 and is disposed on a rear side with respect to the reflection mirror 30. The reflection mirror 32 is disposed on a rear side with respect to the medium arrangement part 16 (rear side of the rear face part 15c of the cover member 15). Further, the reflection mirror 32 is disposed on an upper side of the reflection mirror 31.

The reflection mirrors 30 through 32 are disposed in an inclined state by a predetermined angle with respect to the upper and lower direction. The reflection mirror 30 is inclined toward the lower side as going to the rear side, and the reflection mirrors 31 and 32 are inclined toward the upper side as going to the rear side. Angles of inclination of the reflection mirrors 30 through 32 with respect to the upper and lower direction are substantially 45°. The light reflected by an under face of the information recording medium 2 placed on the glass plate 3 is made incident on the reflection mirror 30. The light reflected by the reflection mirror 30 is made incident on the reflection mirror 31, and the light reflected by the reflection mirror 31 is made incident on the reflection mirror 32.

The optical system 7 includes two reflection mirrors (total reflection mirror) 33 and 34 which are formed in a rectangular flat plate shape. The reflection mirrors 33 and 34 are disposed on an upper side with respect to the information recording medium 2 placed on the glass plate 3. Specifically, the reflection mirror 33 is disposed on an upper side of an ID card 2B placed on the glass plate 3. Further, the reflection mirror 33 is disposed on an upper side of the upper face part 15a of the cover member 15 (upper side with respect to the medium arrangement part 16). The reflection mirror 34 is disposed at the substantially same height as the reflection mirror 33 and is disposed on a rear side with respect to the glass plate 3 (in other words, rear side with respect to the medium arrangement part 16).

Each of the reflection mirrors 33 and 34 is disposed in an inclined state by a predetermined angle with respect to the upper and lower direction. The reflection mirror 33 is inclined toward an upper side as going to the rear side, and the reflection mirror 34 is inclined toward the lower side as going to the rear side. Angles of inclination of the reflection mirrors 33 and 34 with respect to the upper and lower direction are substantially 45°. The light reflected by an upper face of the information recording medium 2 placed on the glass plate 3 is made incident on the reflection mirror 33. The light reflected by the reflection mirror 33 is made incident on the reflection mirror 34.

The image-forming optical system 9 includes an image-forming lens 35. The image-forming lens 35 is disposed on a rear side of the reflection mirror 32. Further, the image-forming lens 35 is disposed on a rear side with respect to the reflection mirror 34. The image pickup element 8 is disposed on a rear side of the image-forming lens 35. The image pickup element 8 is disposed so that an imaging surface of the image pickup element 8 faces the front side.

The beam splitter 13 is formed in a rectangular flat plate shape. The beam splitter 13 in this embodiment is a half mirror whose transmittance and reflectance of light are equal to each other. The beam splitter 13 is disposed between the reflection mirror 32 and the image-forming lens 35 in the front and rear direction. In other words, the beam splitter 13 is disposed on the rear side of the reflection mirror 32 and on the front side of the image-forming lens 35. Further, the beam splitter 13 is disposed on the lower side of the reflection mirror 34.

The beam splitter 13 is disposed in an inclined state by a predetermined angle with respect to the upper and lower direction. Specifically, the beam splitter 13 is inclined toward the lower side as going to the rear side. An angle of inclination of the beam splitter 13 with respect to the upper and lower direction is substantially 45°. The beam splitter 13 transmits a half of the light reflected by the reflection mirror 32 toward image-forming lens 35 and reflects a half of the light reflected by the reflection mirror 34 toward the image-forming lens 35.

(Structure of Shutter Mechanism)

The shutter mechanism 14 includes a shutter 37 which is movable between a first light shielding position 37A (see FIG. 5B) where a light path between the optical system 6 and the beam splitter 13 (in other words, a light path between the reflection mirror 32 and the beam splitter 13) is blocked, and a second light shielding position 37B (see FIG. 5A) where a light path between the optical system 7 and the beam splitter 13 (in other words, a light path between the reflection mirror 34 and the beam splitter 13) is blocked. The shutter 37 is provided with a light shielding part 37a which blocks either of the light paths between the reflection mirrors 32 and 34 and the beam splitter 13.

The shutter mechanism 14 includes a shutter drive mechanism structured to move the shutter 37 between the first light shielding position 37A and the second light shielding position 37B. The shutter drive mechanism includes a lever member 39 to which the shutter 37 is fixed, a solenoid (not shown) for turning the lever member 39, and the like. The lever member 39 is turnable with the right and left direction as an axial direction of turning.

(Structure of Medium Pressing Mechanism)

Figure 6A:
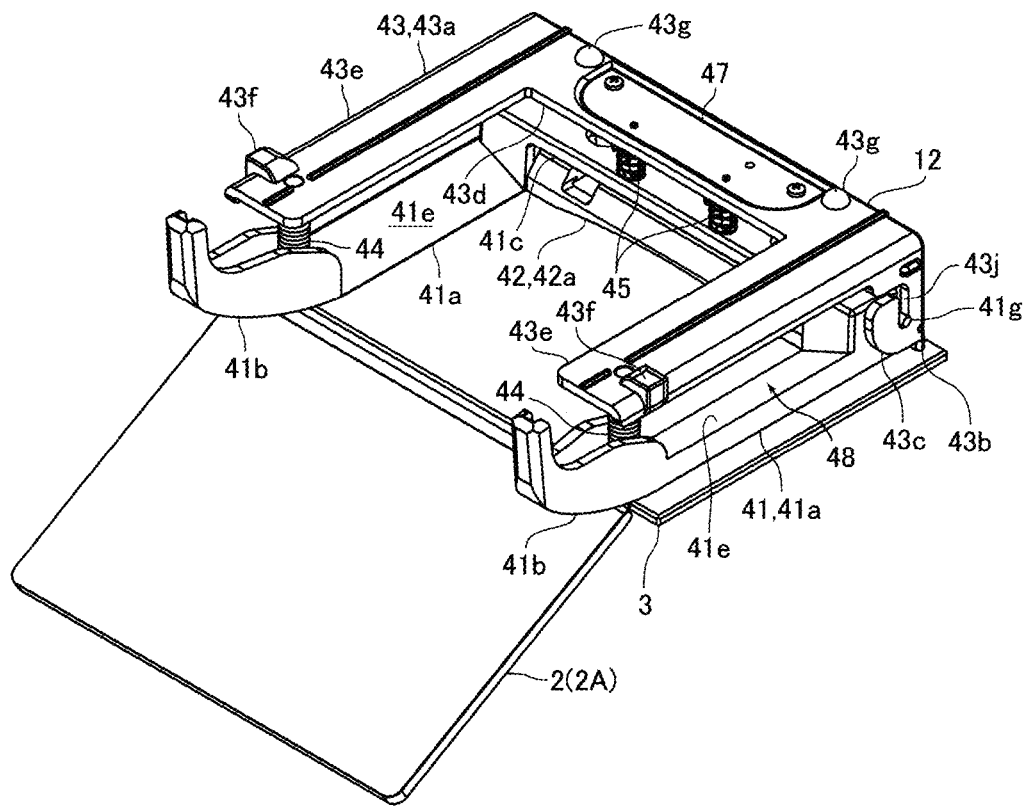
FIG. 6A and FIG. 6B are explanatory perspective views showing states in which an information recording medium has been inserted into the information reading device shown in FIG. 1.
Figure 6B:
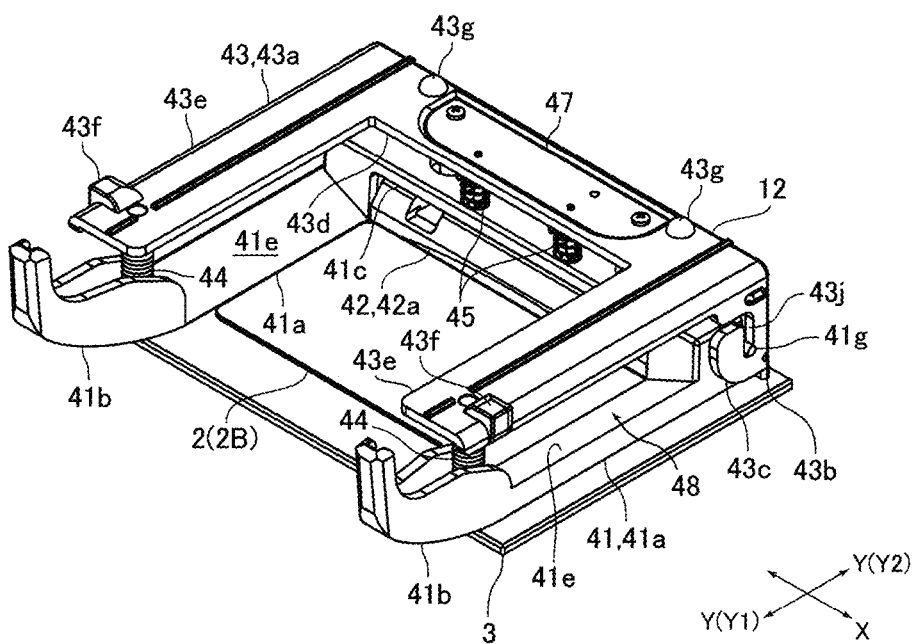

FIG. 6A and FIG. 6B are explanatory perspective views showing states in which an information recording medium 2 has been inserted into the information reading device 1 shown in FIG. 1.

The medium pressing mechanism 12 is disposed in an inside of the medium arrangement part 16. The medium pressing mechanism 12 includes a pressing member 41 having two pressing parts 41a structured to press down both end parts in the right and left direction of a passport 2A from the upper side, a contact member 42 having a contact part 42a structured to contact with a rear end (back end) of an ID card 2B, and a holding member 43 which holds the pressing member 41 and the contact member 42. Further, the medium pressing mechanism 12 includes compression coil springs 44 and 45 which urge the pressing member 41 to the lower side with respect to the holding member 43. The medium pressing mechanism 12 in this embodiment includes two compression coil springs 44 and two compression coil springs 45, i.e., totaled four compression coil springs 44 and 45.

The holding member 43 is provided with an upper face part 43a structuring an upper face of the medium pressing mechanism 12, a rear face part 43b structuring a rear face of the medium pressing mechanism 12, and side face parts 43c structuring right and left side faces on the rear end side of the medium pressing mechanism 12. The upper face part 43a is structured of a base part 43d which is formed in a substantially rectangular flat plate shape whose length in the right and left direction is long, and two protruded parts 43e which are protruded toward the front side from both end sides in the right and left direction of the base part 43d. The base part 43d is disposed so that a thickness direction of the base part 43d and the upper and lower direction are coincided with each other. The protruded part 43e is formed in a substantially rectangular flat plate shape whose length in the front and rear direction is long and is disposed so that a thickness direction of the protruded part 43e and the upper and lower direction are coincided with each other.

The rear face part 43b is formed in a substantially rectangular flat plate shape whose length in the right and left direction is long and is disposed so that a thickness direction of the rear face part 43b and the front and rear direction are coincided with each other. An upper end of the rear face part 43b is connected with a rear end of the base part 43d. The side face part 43c is formed in a substantially rectangular flat plate shape and is disposed so that a thickness direction of the side face part 43c and the right and left direction are coincided with each other. The upper ends of the side face parts 43c are respectively connected with both ends in the right and left direction of the base part 43d, and the rear ends of the side face parts 43c are respectively connected with both ends in the right and left direction of the rear face part 43b.

An upper face of the upper face part 43a is formed with two protruded parts 43f and two protruded parts 43g which are protruded toward the upper side. The protruded parts 43f are formed in respective front end side portions of two protruded parts 43e. The protruded parts 43g are respectively formed on both end sides in the right and left direction of the base part 43d. An upper face of the protruded part 43f is formed to be a flat face perpendicular to the upper and lower direction. The protruded part 43g is formed in a hemispherical shape. Upper faces of the protruded parts 43f and upper ends of the protruded parts 43g are contacted with an under face of the upper face part 15a of the cover member 15.

A columnar spring holding part is formed on a front end side of the protruded part 43e so as to be protruded toward the lower side and the spring holding part is inserted into an inner peripheral side of the compression coil spring 44. The base part 43d is fixed with a spring holding member 47 which is formed with a shaft part inserted into an inner peripheral side of the compression coil spring 45. The spring holding member 47 is formed with the two shaft parts which are protruded from the base part 43d toward the lower side. The side face part 43c is formed with a guide groove 43j structured to guide the pressing member 41 in the upper and lower direction with respect to the holding member 43. The guide groove 43j is penetrated through the side face part 43c in the right and left direction and is formed in an elongated hole shape whose longitudinal direction is the upper and lower direction.

The pressing member 41 is, as described above, provided with two pressing parts 41a. The pressing part 41a is formed in a plate shape whose length in the front and rear direction is long. Further, the pressing member 41 is provided with guide parts 41b which are respectively connected with front ends of two pressing parts 41a and a connection part 41c which connects rear end parts (back end parts) of the two pressing parts 41a. The connection part 41c connects upper sides of the rear end parts of the pressing parts 41a with each other.

An under face of the pressing part 41a is formed to be a flat face which is perpendicular to the upper and lower direction. An upper face 41e of the pressing part 41a is formed to be an inclined face which is inclined toward a lower side as going to an inner side in the right and left direction. The pressing parts 41a are contacted with substantially the entire both end parts in the right and left direction of a passport 2A placed on the glass plate 3 (specifically, both end parts in the right and left direction of a front cover of a passport 2A) from an upper side to press down substantially the entire both end parts in the right and left direction of the passport 2A from an upper side. Therefore, a distance in the right and left direction of the two pressing parts 41a is set to be smaller than a width in the right and left direction of the passport 2A (see FIG. 3A and FIG. 6A). On the other hand, a distance in the right and left direction of the two pressing parts 41a is set to be wider than a width in the right and left direction of an ID card 2B (see FIG. 3B and FIG. 6B).

An under face of the guide part 41b is formed in a convex curved surface shape which is a circular arc shape when viewed in the right and left direction. Further, the under face of the guide part 41b is inclined toward the upper side as going to the front side. Inner side faces in the right and left direction of the guide parts 41b are formed so as to be widened to outer sides in the right and left direction as going to the front side. The guide parts 41b function to guide a passport 2A inserted into the medium insertion port 10a to a lower side of the pressing part 41a. Further, the guide parts 41b function to guide an ID card 2B inserted into the medium insertion port 10a between the two pressing parts 41a.

The rear end part of the guide part 41b and the pressing part 41a are disposed on a lower side of the protruded part 43e of the holding member 43. The connection part 41c is disposed on a lower side of the base part 43d of the holding member 43. A lower end of the compression coil spring 44 is contacted with an upper face of the rear end part of the guide part 41b, and a lower end of the compression coil spring 45 is contacted with an upper face of the connection part 41c. In other words, the pressing member 41 is urged to the lower side with respect to the holding member 43 by the compression coil springs 44 and 45 and is movable in the upper and lower direction with respect to the holding member 43. When a passport 2A is not inserted into the information reading device 1, the under faces of the pressing parts 41a are contacted with an upper face of the glass plate 3 by the urging forces of the compression coil springs 44 and 45. In other words, when a passport 2A is not inserted into the information reading device 1, the pressing member 41 is contacted with the upper face of the glass plate 3.

Each of both side faces in the right and left direction of the connection part 41c is formed with a guide pin 41g which is protruded to an outer side in the right and left direction. The guide pin 41g is formed in a columnar shape. The guide pin 41g is engaged with the guide groove 43j of the holding member 43. The pressing member 41 is guided in the upper and lower direction with respect to the holding member 43 by the guide pins 41g and the guide grooves 43j. Further, the pressing member 41 is turnable with respect to the holding member 43 with the guide pins 41g as a turning center and the right and left direction as an axial direction of turning.

A space is formed between the pressing part 41a and the protruded part 43e in the upper and lower direction. A light passage part 48 where a light emitted from the illumination part 5 is passed is structured between the pressing part 41a and the protruded part 43e in the upper and lower direction. In other words, the light passage part 48 where the light emitted from the illumination part 5 and transmitted through the side face part 15b is passed toward an upper face of an information recording medium 2 placed on the glass plate 3 is structured on an upper side of the pressing part 41a and on a lower side of the protruded part 43e.

The contact member 42 is disposed on the lower side of the connection part 41c of the pressing member 41. The contact member 42 is, as described above, provided with a contact part 42a. Further, the contact member 42 is provided with a support part 42b which supports the contact part 42a (see FIG. 2). The contact part 42a is formed in a flat plate shape whose length in the right and left direction is long and is disposed so that a thickness direction of the contact part 42a and the front and rear direction are substantially coincided with each other. The support part 42b is formed in a substantially flat plate shape whose length in the right and left direction is long and is disposed so that a thickness direction of the support part 42b and the upper and lower direction are substantially coincided with each other. The contact part 42a is connected with a front end of the support part 42b. Further, the contact part 42a is extended from the front end of the support part 42b to a lower side.

A width in the right and left direction of the contact part 42a is set to be smaller than a distance in the right and left direction of the two pressing parts 41a. Further, the contact part 42a is disposed between the two pressing parts 41a when viewed in the front and rear direction. Rear end parts of both right and left end faces of the support part 42b are formed with projection pins which are protruded to outer sides in the right and left direction. The projection pin is engaged with a recessed part formed in the holding member 43 and the contact member 42 is turnable with respect to the holding member 43 with the projection pins as a turning center and the right and left direction as an axial direction of turning. A pressing-up part formed in the pressing member 41 is contacted with each of both end sides in the right and left direction of the support part 42b from a lower side. The pressing-up part is disposed on a front side of the turning center of the contact member 42 with respect to the holding member 43.

In a state that an information recording medium 2 is not inserted into the information reading device 1, the lower end face of the contact part 42a is a flat face perpendicular to the upper and lower direction and is contacted with the upper face of the glass plate 3. Further, in this state, the front face of the contact part 42a is a flat face perpendicular to the front and rear direction. Further, in this state, the front face of the contact part 42a is disposed on a slightly front side with respect to the front end of the connection part 41c of the pressing member 41. A distance between the front end face of the glass plate 3 and the front face of the contact part 42a (distance in the front and rear direction) is set to be shorter than a width in the front and rear direction of a front cover of a passport 2A placed on the glass plate 3 (see FIG. 6A). Further, the distance between the front end face of the glass plate 3 and the front face of the contact part 42a is set to be longer than a width in the front and rear direction of an ID card 2B placed on the glass plate 3 (see FIG. 6B).

In this embodiment, when a passport 2A is begun to be inserted into the information reading device 1, the passport 2A goes into the lower sides of the pressing parts 41a of the pressing member 41 and the front end side of the pressing part 41a is moved upward. Further, when the passport 2A has reached to a predetermined position of the information reading device 1, the support part 42b is pushed upward by the pressing-up part of the pressing member 41. When the support part 42b is pushed up, the contact member 42 is turned and the contact part 42a is moved upward. When the passport 2A is further inserted into the information reading device 1, a rear end of the passport 2A (rear end of its front cover) is passed through the lower side of the contact part 42a and reached to the rear side with respect to the contact part 42a. As described above, in this embodiment, when a passport 2A is inserted into the information reading device 1, the pressing parts 41a are moved upward by the passport 2A and press down both end parts in the right and left direction of the passport 2A from an upper side, and the contact part 42a is moved upward and thus a rear end of the passport 2A is passed through the lower side of the contact part 42a.

On the other hand, as described above, a width in the right and left direction of an ID card 2B placed on the glass plate 3 is shorter than the distance in the right and left direction of the two pressing parts 41a. Therefore, even when an ID card 2B is inserted into the information reading device 1, the pressing part 41a is not moved upward and thus the pressing member 41 is not moved upward. Accordingly, even when an ID card 2B is inserted into the information reading device 1, the contact part 42a is not moved upward. Therefore, when an ID card 2B is inserted into the information reading device 1, a rear end of the ID card 2B is contacted with the contact part 42a (see FIG. 3B and FIG. 6B). Specifically, the rear end of the ID card 2B is contacted with the front face of the contact part 42a.

(Structure of Semi-Light Shielding Member)

Figure 7:
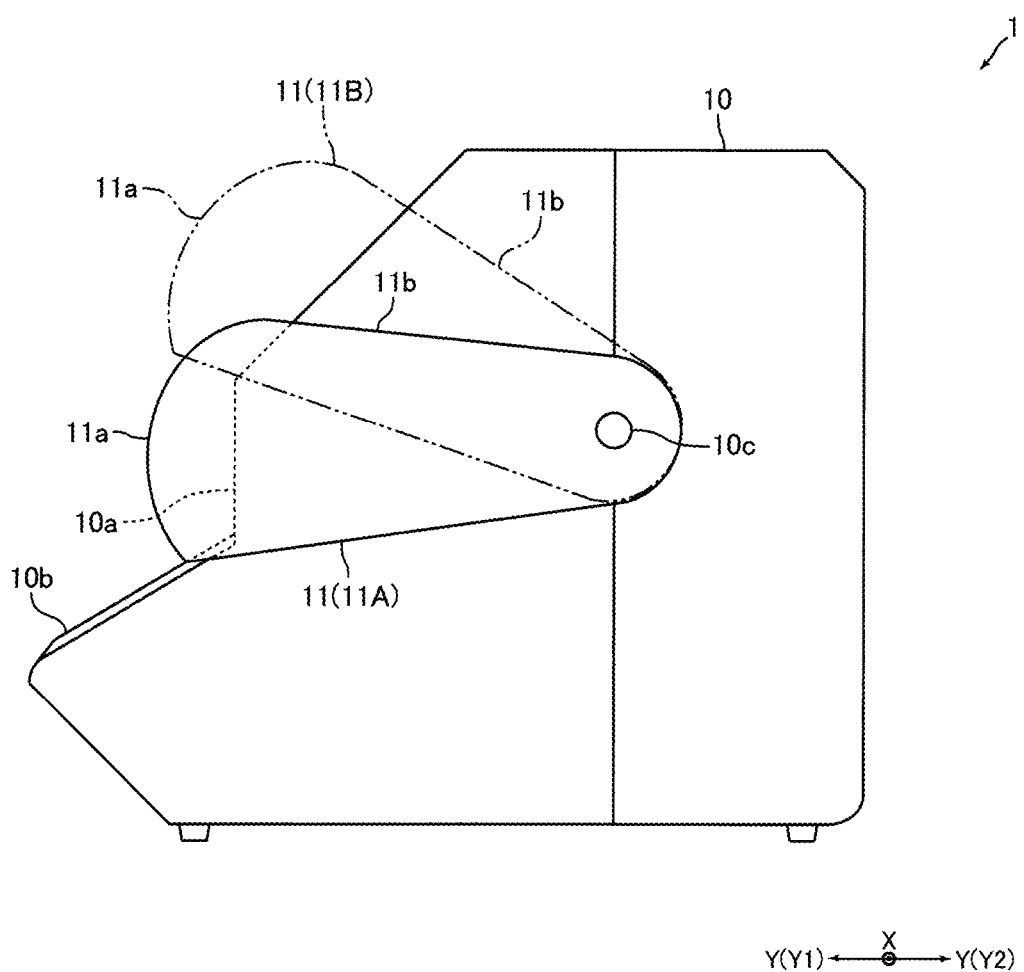
FIG. 7 is a side view showing the information reading device in FIG. 1.
Figure 8:
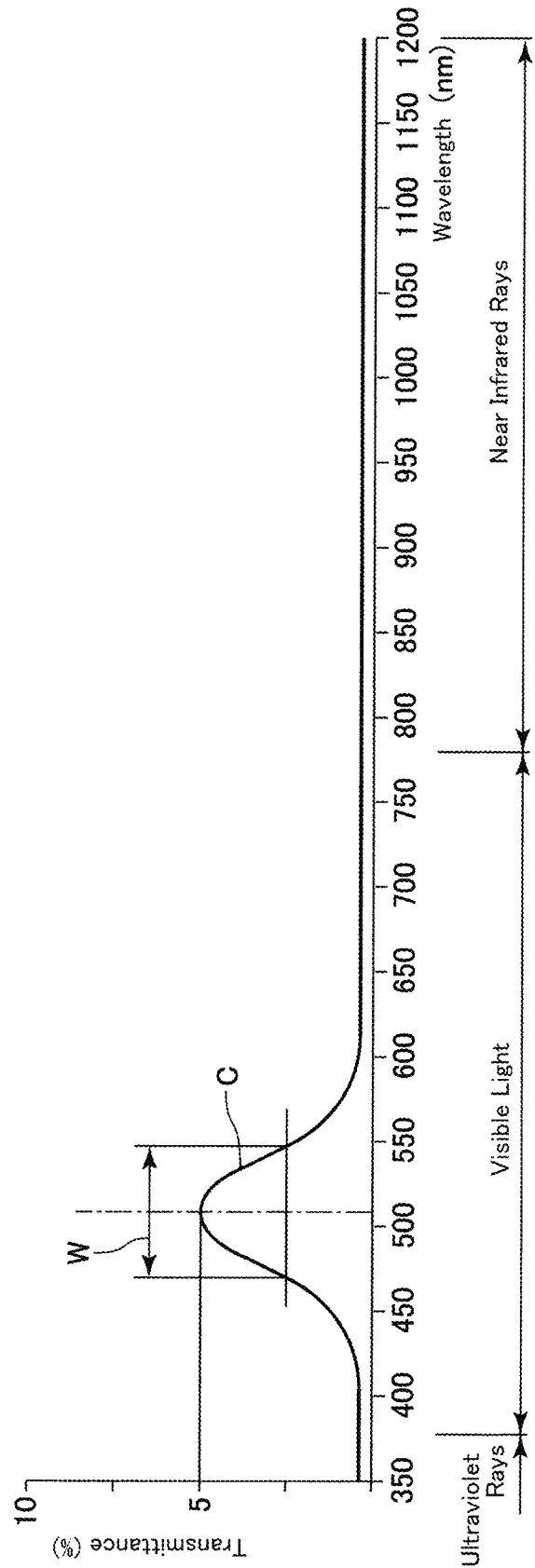
FIG. 8 is a view showing an example of a transmittance curve indicating a relationship between transmittance of light and a wavelength of a semi-light shielding part shown in FIG. 1.

FIG. 7 is a side view showing the information reading device 1 in FIG. 1. FIG. 8 is a view showing an example of a transmittance curve "C" indicating a relationship between transmittance of light and a wavelength of a semi-light shielding part 11a shown in FIG. 1.

A semi-light shielding member 11 is formed of resin. Specifically, the semi-light shielding member 11 is formed of resin mixed with ink having light absorption characteristics of a specific wavelength region, and thus the semi-light shielding member 11 transmits a light of a part of a wavelength region and blocks lights in other wavelength regions. Further, the semi-light shielding member 11 is formed in a thin curved plate shape such as a shield of a full-face type helmet for a motorcycle. As described above, the semi-light shielding member 11 is attached to the housing 10. Specifically, the semi-light shielding member 11 is attached to the housing 10 so as to be turnable with the right and left direction as an axial direction of turning.

The semi-light shielding member 11 is structured of a semi-light shielding part 11a for covering the medium insertion port 10a from the upper side and the front side and two connection parts 11b which are turnably connected with both respective right and left side faces of the housing 10. The size of the semi-light shielding part 11a is set so as to be capable of covering the entire medium insertion port 10a. Specifically, the size of the semi-light shielding part 11a is a size capable of covering the entire medium insertion port 10a from the upper side and the front side. The connection parts 11b are connected with both right and left ends of the semi-light shielding part 11a. Further, the connection parts 11b are extended from both right and left ends of the semi-light shielding part 11a to the rear side. Both right and left side faces of the housing 10 are formed with fixed shafts 10c which turnably support the connection parts 11b. The semi-light shielding part 11a and the two connection parts 11b are integrally formed with each other.

The semi-light shielding member 11 is turnable with respect to the housing 10 between a light shielding position 11A (position shown by the solid line in FIG. 7 and by the two-dot chain line in FIG. 1) where the semi-light shielding part 11a covers the upper side and the front side of the medium insertion port 10a, and an open position 11B (position shown by the two-dot chain line in FIG. 7) where the front side of the medium insertion port 10a is opened. In other words, the semi-light shielding member 11 is movable with respect to the housing 10 between the light shielding position 11A and the open position 11B. When the semi-light shielding member 11 located at the light shielding position 11A is to be turned to the open position 11B, the semi-light shielding member 11 is turned in a clockwise direction in FIG. 7 and the semi-light shielding part 11a is moved to an obliquely upper and front side. Further, a turning operation of the semi-light shielding member 11 is manually performed by an operator of the information reading device 1.

In this embodiment, when the semi-light shielding member 11 is disposed at the light shielding position 11A, the semi-light shielding part 11a completely covers an upper side and a front side of the medium insertion port 10a. Further, in this embodiment, an inclined face 10b which is inclined toward the lower side as going to the front side is formed on a lower side of the medium insertion port 10a and, when the semi-light shielding member 11 is located at the light shielding position 11A, the entire medium insertion port 10a is covered by the inclined plane 10b and the semi-light shielding part 11a.

As described above, the semi-light shielding member 11 transmits light of a part of a wavelength region and blocks lights of other wavelength regions. In other words, the semi-light shielding part 11a transmits light of a part of a wavelength region and blocks lights in other wavelength regions. A transmittance curve "C" indicating a relationship between transmittance of light and a wavelength of the semi-light shielding part 11a (in other words, a relationship between transmittance of light and a wavelength of the semi-light shielding member 11) is, as shown in FIG. 8, a curve having a peak in the wavelength region of visible light.

In this embodiment, the transmittance curve "C" has only one peak in the wavelength region of visible light. Further, in this embodiment, the transmittance curve "C" has a peak within the wavelength region of 500 nm through 560 nm. In other words, the transmittance curve "C" has a peak within a wavelength region of green light, and the semi-light shielding part 11a is provided with light transmission characteristics having a peak in the green light. Specifically, the transmittance curve "C" becomes a peak at a wavelength of 507 nm where the relative luminous efficiency becomes the highest in a dark place. The transmittance of light when the transmittance curve "C" becomes the peak is, for example, 5%. Further, a half-value width "W" of the peak of the transmittance curve "C" is 80 nm or less. Specifically, the half-value width "W" is 80 nm.

(Information Reading Operation of Information Reading Device)

In a case that information recorded on a passport 2A is to be read by the information reading device 1, the passport 2A is inserted into the medium insertion port 10a so that a rear face of its front cover where personal information is recorded faces a lower side. When the passport 2A is to be inserted into the medium insertion port 10a, the semi-light shielding member 11 is disposed at a position where the passport 2A can be inserted into the medium insertion port 10a. In other words, the semi-light shielding member 11 is disposed at a position where a front side of at least the lower end part of the medium insertion port 10a is opened and is not disposed at the light shielding position 11A. When the passport 2A is inserted into the medium insertion port 10a, the pressing parts 41a are moved upward by the passport 2A and both end parts in the right and left direction of the passport 2A are pressed down by the pressing parts 41a from an upper side, and a rear end of the passport 2A goes to a rear side with respect to the contact part 42a and the passport 2A is placed on the glass plate 3.

When the passport 2A is placed on the glass plate 3, an operator of the information reading device 1 turns the semi-light shielding member 11 to the light shielding position 11A. When the semi-light shielding member 11 is disposed at the light shielding position 11A, the illumination parts 4 emit light and information recorded on the passport 2A is optically read. In this case, the shutter 37 is disposed at the second light shielding position 37B. Further, the illumination parts 5 do not emit light. When the information recorded on the passport 2A is read by the information reading device 1, an operator of the information reading device 1 turns the semi-light shielding member 11 located at the light shielding position 11A to a position where the passport 2A is capable of being taken out and the passport 2A is taken out from the information reading device 1.

On the other hand, when information recorded on an ID card 2B is to be read by the information reading device 1, the ID card 2B is inserted into the information reading device 1. When an ID card 2B is to be inserted into the information reading device 1, the semi-light shielding member 11 is disposed at a position where the ID card 2B is capable of being inserted into the medium insertion port 10a and is not disposed at the light shielding position 11A. When an ID card 2B is inserted into the information reading device 1, a rear end of the ID card 2B is contacted with the contact part 42a and the ID card 2B is placed on the glass plate 3.

When the ID card 2B is placed on the glass plate 3, an operator of the information reading device 1 turns the semi-light shielding member 11 to the light shielding position 11A. When the semi-light shielding member 11 is disposed at the light shielding position 11A, first, the illumination parts 4 emit light and information recorded on an under face of the ID card 2B is optically read. In this case, the shutter 37 is disposed at the second light shielding position 37B and the illumination parts 5 do not emit light. When the information recorded on the under face of the ID card 2B has been read, the shutter 37 is moved to the first light shielding position 37A and the illumination parts 5 emit light and information recorded on an upper face of the ID card 2B is optically read. In this case, the illumination parts 4 do not emit light.

When information recorded on the ID card 2B has been read by the information reading device 1, an operator of the information reading device 1 turns the semi-light shielding member 11 located at the light shielding position 11A to a position where the ID card 2B is capable of being taken out and then, the ID card 2B is taken out from the information reading device 1. In accordance with an embodiment of the present invention, when information recorded on the ID card 2B is to be read, it may be structured that information recorded on an under face of the ID card 2B is read after information recorded on an upper face of the ID card 2B has been read.

(Principal Effects in this Embodiment)

As described above, in this embodiment, in a case that information recorded on an information recording medium 2 is to be read by the information reading device 1, when the information recording medium 2 is placed on the glass plate 3, an operator of the information reading device 1 turns the semi-light shielding member 11 to the light shielding position 11A to cover an upper side and a front side of the medium insertion port 10a by the semi-light shielding part 11a. Therefore, according to this embodiment, influence of external light on an image of the information recording medium 2 read by the information reading device 1 can be restrained by the semi-light shielding part 11a.

Especially, in this embodiment, when the semi-light shielding member 11 is disposed at the light shielding position 11A, the entire medium insertion port 10a is covered by the inclined face 10b and the semi-light shielding part 11a. Therefore, for example, even when the information reading device 1 is provided in a place which is easily affected by external light such as a place where sunlight is indirectly incident, influence of external light on an image of the information recording medium 2 read by the information reading device 1 can be restrained. Further, in this embodiment, the transmittance curve "C" has only one peak in a wavelength region of visible light and thus, in comparison with a case that the transmittance curve "C" has a plurality of peaks in a wavelength region of visible light, a width of a wavelength region of light transmitting through the semi-light shielding part 11a can be narrowed. Further, the half-value width "W" of a peak of the transmittance curve "C" is 80 nm or less and thus, the width of a wavelength region of light transmitting through the semi-light shielding part 11a can be narrowed. Therefore, according to this embodiment, influence of external light on an image of the information recording medium 2 read by the information reading device 1 can be restrained.

In this embodiment, the transmittance curve "C" indicating a relationship between the transmittance of light and a wavelength of the semi-light shielding part 11a is a curve having a peak within a wavelength region of visible light. Therefore, in this embodiment, in a case that an information recording medium 2 is to be inserted into the medium insertion port 10a, even when a part of the medium insertion port 10a is covered by the semi-light shielding part 11a, the information recording medium 2 inserted into the information reading device 1 and placed on the glass plate 3 can be confirmed by visual observation through the semi-light shielding part 11a. In other words, according to this embodiment, even when the semi-light shielding member 11 is not turned to a position where an information recording medium 2 in the information reading device 1 can be directly confirmed by visual observation, the information recording medium 2 in an inside of the information reading device 1 can be confirmed by visual observation through the semi-light shielding part 11a. Therefore, according to this embodiment, even when an information recording medium 2 inserted into the information reading device 1 can be confirmed by visual observation, operability of the information reading device 1 can be enhanced.

In this embodiment, the transmittance curve "C" has a peak within a wavelength region of green light whose relative luminous efficiency is high. Therefore, in this embodiment, even when transmittance of light transmitting through the semi-light shielding part 11a is reduced, the information recording medium 2 inserted into the information reading device 1 is easily confirmed by visual observation through the semi-light shielding part 11a. Accordingly, in this embodiment, influence of external light on an image of an information recording medium 2 read by the information reading device 1 can be effectively restrained by reducing transmittance of light transmitting through the semi-light shielding part 11a and, in addition, the information recording medium 2 inserted into the information reading device 1 is easily confirmed by visual observation through the semi-light shielding part 11a.

Other Embodiments

Although the present invention has been shown and described with reference to a specific embodiment, various changes and modifications will be apparent to those skilled in the art from the teachings herein.

In the embodiment described above, when information recorded on an information recording medium 2 is to be optically read, the semi-light shielding member 11 is disposed at the light shielding position 11A where the semi-light shielding part 11a completely covers an upper side and a front side of the medium insertion port 10a. However, the present invention is not limited to this embodiment. For example, in a case that the information reading device 1 is provided in a place which is hard to be affected by external light, it may be structured that, when information recorded on an information recording medium 2 is to be optically read, the semi-light shielding member 11 is disposed at a position where a part on a front side of the medium insertion port 10a is opened (position where a part on a front side of the medium insertion port 10a is not covered by the semi-light shielding part 11a). Further, in the embodiment described above, when the semi-light shielding member 11 is disposed at the open position 11B, an upper side of the medium insertion port 10a may be opened in addition to a front side of the medium insertion port 10a.

Figure 9:
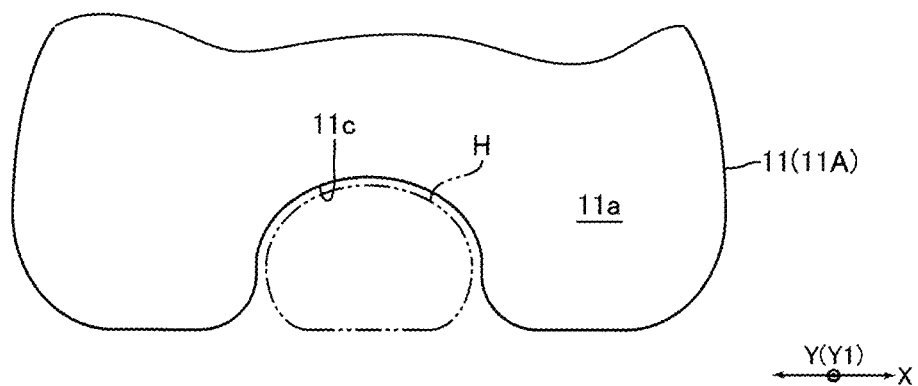
FIG. 9 is an explanatory view showing a structure of a semi-light shielding part in accordance with another embodiment of the present invention.

In the embodiment described above, as shown in FIG. 9, it may be structured that the semi-light shielding part 11a is formed with a cut-out part 11c for preventing an interference of a hand "H" of an operator pressing down an information recording medium 2 placed on the glass plate 3 from an upper side with the semi-light shielding part 11a when the semi-light shielding member 11 is located at the light shielding position 11A. In this case, the cut-out part 11c is formed so that a space between the cut-out part 11c and the hand "H" is minimized.

In a case that the cut-out part 11c is formed in the semi-light shielding part 11a, even when the semi-light shielding member 11 is disposed at the light shielding position 11A, an operator is capable of pressing down an information recording medium 2 placed on the glass plate 3 toward the glass plate 3. Therefore, for example, in a case that information of an under face of an information recording medium 2 which is easily floated from an upper face of the glass plate 3 like a new passport 2A or a passport 2A having a number of pages is to be read, even when the semi-light shielding member 11 is disposed at the light shielding position 11A, floating of an under face of the information recording medium 2 from an upper face of the glass plate 3 is prevented and information of the under face of the information recording medium 2 can be read with a high degree of accuracy. In accordance with an embodiment of the present invention, in the embodiment shown in FIG. 9, for example, a space between the cut-out part 11c and a hand "H" may be covered by an elastic member such as rubber which is formed in a curtain shape.

Figure 10:
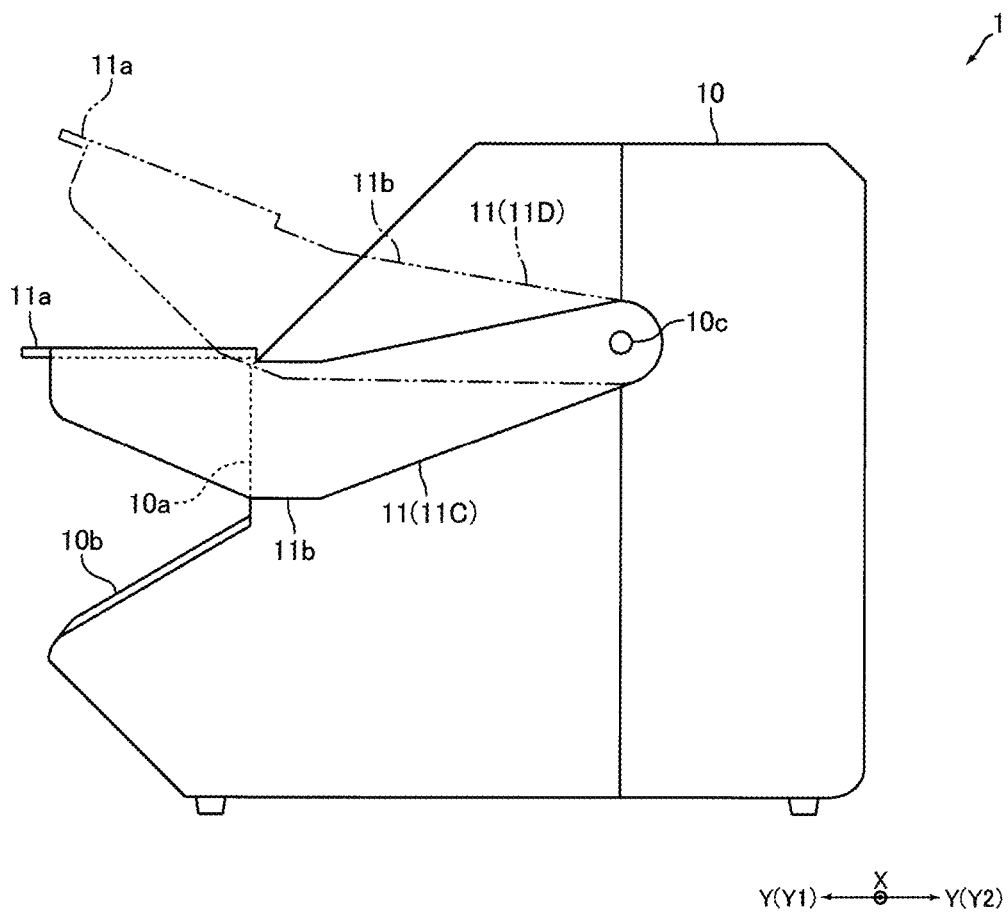
FIG. 10 is an explanatory view showing a structure of a semi-light shielding part in accordance with another embodiment of the present invention.

In the embodiment described above, for example, in a case that an information reading device 1 is provided in a place which is affected by external light only from an upper side, the semi-light shielding member 11 may be provided with a semi-light shielding part 11a for covering the medium insertion port 10a from an upper side as shown in FIG. 10. In this case, for example, the semi-light shielding member 11 is turnable with respect to the housing 10 between a light shielding position 11C (position as shown by the solid line in FIG. 10) where the semi-light shielding part 11a covers an upper side of the medium insertion port 10a and an open position 11D where the semi-light shielding part 11a is retreated to an upper side. Further, in this case, a length in the front and rear direction of the semi-light shielding part 11a when the semi-light shielding member 11 is disposed at the light shielding position 11C is set to be longer than a length in the front and rear direction of the semi-light shielding part 11a in the embodiment described above. In FIG. 10, the same reference signs are used in the structures similar to the embodiment described above.

In the embodiment described above, the half-value width "W" of a peak of the transmittance curve "C" may be larger than 80 nm. Further, in the embodiment described above, the transmittance curve "C" may have a peak within a wavelength region of visible light other than green light. For example, the transmittance curve "C" may have a peak within a wavelength region of blue light. In other words, the transmittance curve "C" may have a peak within a wavelength region from 435 nm to 480 nm. In addition, in the embodiment described above, the transmittance curve "C" may have two or more peaks within a wavelength region of visible light.

In the embodiment described above, the semi-light shielding member 11 is formed of resin mixed with ink having light absorption characteristics of a specific wavelength region, and thus the semi-light shielding member 11 transmits a light of a part of a wavelength region and blocks lights in other wavelength regions. However, it may be structured that the semi-light shielding member 11 transmits a light of a part of a wavelength region and blocks lights in other wavelength regions by forming a film (coating) having light absorption characteristics on a surface of light transmissive resin whose transmittance of visible light and the like is high by vapor deposition or the like. In this case, a half-value width "W" of a peak of the transmittance curve "C" is easily narrowed, but a manufacturing cost of the semi-light shielding member 11 is increased.

In the embodiment described above, it may be structured that the connection parts 11b block visible light. Further, in the embodiment described above, it may be structured that transmittance of light of visible light and the like of the connection parts 11b may be increased. Further, in the embodiment described above, an image-forming optical system to which light passed through the optical system 6 is made incident and an image pickup element may be separately provided from an image-forming optical system to which light passed through the optical system 7 is made incident and an image pickup element. In addition, in the embodiment described above, the information reading device 1 may be, for example, provided with a transparent resin plate such as an acrylic plate instead of the glass plate 3.

In the embodiment described above, no IC chip may be incorporated in an information recording medium 2. In this case, an antenna disposed on a lower side of the glass plate 3 and the antenna 17 are not required. Further, in the embodiment described above, the information recording medium 2 may be a medium other than a passport 2A and an ID card 2B. For example, the information recording medium 2 may be a driver's license. In addition, in the embodiment described above, the information reading device 1 is a manual type reading device. However, an information reading device may be a medium conveyance type reading device including a conveyance mechanism for an information recording medium 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information reading device structured to optically read information recorded on an information recording medium, the information reading device comprising:
    a transparent placement member on which the information recording medium is placed;
    a first illumination part which emits light on an under face of the information recording medium placed on the placement member;
    a second illumination part which emits light on an upper face of the information recording medium placed on the placement member;
    a first optical system structured to read information recorded on the under face of the information recording medium placed on the placement member;
    a second optical system structured to read information recorded on the upper face of the information recording medium placed on the placement member;
    a housing comprising a front face formed with a medium insertion port into which the information recording medium is inserted, and the housing accommodating the placement member, the first illumination part, the second illumination part, the first optical system and the second optical system; and
    a semi-light shielding member comprising a semi-light shielding part which transmits light of a part of a wavelength region and blocks lights of other wavelength regions and covers at least an upper side of the medium insertion port;
    wherein a transmittance curve indicating a relationship between transmittance of light and a wavelength of the semi-light shielding part is a curve having a peak within a wavelength region of visible light.

2. The information reading device according to claim 1, wherein the semi-light shielding member is movable with respect to the housing between a light shielding position where the semi-light shielding part covers an upper side and a front side of the medium insertion port and an open position where at least the front side of the medium insertion port is opened.

3. The information reading device according to claim 2, wherein the semi-light shielding part comprises a cut-out part structured to prevent an interference of a hand of an operator pressing down the information recording medium placed on the placement member from an upper side with the semi-light shielding part when the semi-light shielding member is located at the light shielding position.

4. The information reading device according to claim 3, wherein the transmittance curve has only one peak within a wavelength region of visible light.

5. The information reading device according to claim 4, wherein the transmittance curve has a peak within a wavelength region from 500 nm to 560 nm.

6. The information reading device according to claim 5, wherein a half-value width of the peak of the transmittance curve is 80 nm or less.

7. The information reading device according to claim 4, wherein a half-value width of the peak of the transmittance curve is 80 nm or less.

8. The information reading device according to claim 2, wherein the transmittance curve has only one peak within a wavelength region of visible light.

9. The information reading device according to claim 8, wherein the transmittance curve has a peak within a wavelength region from 500 nm to 560 nm.

10. The information reading device according to claim 9, wherein a half-value width of the peak of the transmittance curve is 80 nm or less.

11. The information reading device according to claim 8, wherein a half-value width of the peak of the transmittance curve is 80 nm or less.

12. The information reading device according to claim 1, wherein the transmittance curve has only one peak within a wavelength region of visible light.

13. The information reading device according to claim 12, wherein the transmittance curve has a peak within a wavelength region from 500 nm to 560 nm.

14. The information reading device according to claim 13, wherein a half-value width of the peak of the transmittance curve is 80 nm or less.

15. The information reading device according to claim 12, wherein a half-value width of the peak of the transmittance curve is 80 nm or less.

* * * * *